April 28, 1925.  
W. T. SEARS  
1,535,867  
CONTROLLING MECHANISM FOR MOTOR VEHICLES  
Original Filed Feb. 3, 1922
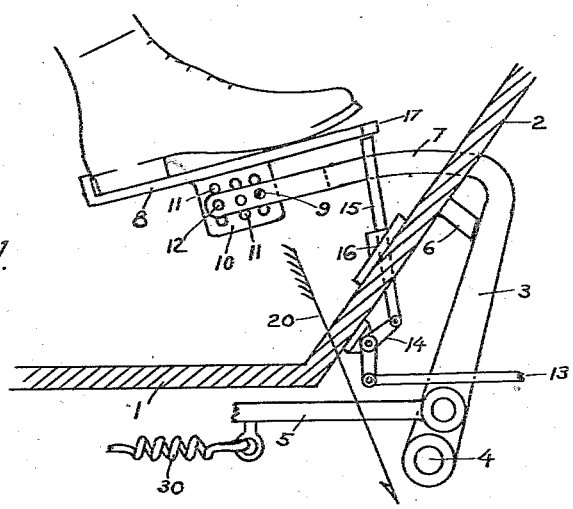
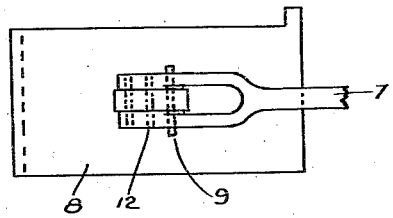
Inventor  
Willard T. Sears  
By his Attorney  
R. H. Strother Patented Apr. 28, 1925.

1,535,867

UNITED STATES PATENT OFFICE.

WILLARD T. SEARS, OF MONTCLAIR, NEW JERSEY; MABEL HELENA SEARS EXECUTRIX OF SAID WILLARD T. SEARS, DECEASED.

CONTROLLING MECHANISM FOR MOTOR VEHICLES.

Application filed February 3, 1922, Serial No. 533,882. Renewed November 29, 1924.

*To all whom it may concern:*

Be it known that I, WILLARD T. SEARS, a citizen of the United States, residing at Montclair, New Jersey, have invented a new and useful Improvement in Controlling Mechanism for Motor Vehicles, of which the following is a specification.

My invention relates to controlling mechanism for motor vehicles, and it has for its principal object to provide certain improvements in the pedal mechanism whereby the operation of an automobile is controlled, and especially to that class of such devices where a pedal pivoted on the brake lever controls not only the brake but also the accelerator.

To the above ends my invention consists in certain features of construction and combinations and arrangements of parts, all of which will be fully set forth herein and particularly pointed out in the claims.

One embodiment of my invention is illustrated in the accompanying drawing, in which Fig. 1 is a side elevation, with parts in section, of the pedal and its immediately associated devices.

Fig. 2 is a bottom view of the pedal and a fragment of the brake lever, and

Fig. 3 is a fragmentary plan view.

In the drawing 1 represents the floor and 2 the foot-board of an automobile. A brake lever 3 is suitably fulcrumed at 4, and provided with a connecting rod 5, extending to the brake mechanism. A suitable spring, diagrammatically represented at 30 but located at any convenient point in the chain of connections, yieldingly retains said lever in its normal position, where it is arrested by any suitable stop 6. The lever 3 may have any suitable form. As shown, it extends upward beneath the foot-board 2, and thence backward through said foot-board in concentric extension 7, to which a pedal 8 is pivoted on a pin 9. As far as my present invention is concerned, this may be any suitable pivotal connection allowing the pedal to rock up and down about the pin 9 as a center, but as here shown, said pedal has a flange or flat lug 10 depending from its under side and having therein nine holes 11, arranged in three rows; and the extension 7 is forked to embrace said lug and is provided with three holes 12 matching the holes in one row of holes in the lug. The construction is such that the pedal can be adjusted bodily up and down by using one or the other of the rows of holes 11; and the pivotal center of the pedal lengthwise of said pedal, can be varied by using one or another of the holes 11 of the selected row and the corresponding hole 12 in extension 7.

The accelerator connections can, of course, be widely varied, but as shown they include a link 13 connected with the throttle, an angled lever 14 pivoted to the under side of the foot-board 2, and a plunger 15, connected at its lower end to said lever 14 and extending thence up through said foot-board, where it is provided with a guide 16. Said plunger terminates just beneath a lug 17 projecting laterally from the front end of the pedal 8 as shown in Figs. 1 and 3, in such position as that a rocking of said pedal downward at its forward end will operate the accelerator.

The brake is operated by pushing the pedal forward bodily, rocking lever 3. The construction is such that, whether the pedal be in its normal position at the time, or in its rocked position to accelerate the engine, in either case the act of applying the brake immediately moves the lug 17 from the plunger 15, which, if it was not already in normal position, will be immediately restored to normal by a spring (not shown).

It will be perceived that when operating the car, the driver keeps his foot on the pedal, and he opens the throttle by rocking said pedal and applies the brake by pushing bodily on said pedal; but the weight of his foot and leg are constantly resting on said pedal, and this must be possible without discomfort to the driver and without operating the brake. In prior devices of this general character, it has been necessary either to make the restoring spring for the brake lever strong enough to support the weight normally resting on it, in which case an undue resistance has been opposed to the operation of the brake; or else some means has been provided to afford a high initial resistance to the operation of the brake lever, which resistance diminished after said lever started to operate. This latter plan was also disadvantageous, because it made the lever hard to start.

My present invention has for its principal object to overcome the disadvantages of prior construction in the particulars just above pointed out, and to provide a construction in which the weight of the foot is easily and safely supported by the brake lever, without adding to the resistance to be overcome in operating said lever. To this end, I so locate the pivot 4 with respect to the pedal, or so locate the pedal with respect to said pivot, as that the line of force which represents the direction of ordinary pressure of the foot on the pedal, passes no farther forward than either through or so close to the pivot 4 as that said pressure has little or no tendency to rock the brake lever, being either dead centered or as nearly so as is necessary for the purpose. In Fig. 1 the arrow 20 is intended to represent, roughly, said line of force, and it is drawn close to and, preferably if anything, a little behind the pivot 4. This line is, of course, not a fixed nor determined line. It will vary as the driver moves his body and also with the jolting of the car. I therefore do not wish to be understood as representing the line of force as passing always exactly through the pivot 4, nor as being always behind said pivot. It is sufficient if said line approximates said pivot to such an extent as not to require that the power of the restoring spring for the brake lever be substantially increased in order to enable said lever to support the weight or ordinary pressure of the foot without moving the brake lever.

It will be noted that the fulcrum 4 of the brake lever is well forward of a vertical line through the pivot of the pedal, so that, when the brake lever is operated, the first part of the motion of the pedal is forward at an upward inclination against gravity; and also, that said fulcrum is forward of a line through the pivot of the pedal and perpendicular or normal to the upper surface of the pedal. It is recognized, however, that the line of pressure is not necessarily normal to said surface.

Various changes may be made in the details of construction and arrangement without departing from my invention.

What I claim as new and desire to secure by Letters Patent is:

1. In the controlling mechanism for motor vehicles, the combination of a brake lever, a pedal pivoted on said brake lever, and an accelerator connection operated by a tilting motion of said pedal about its pivot, the fulcrum of said brake lever occupying a forward position relative to said pedal such that the line of force due to the ordinary pressure of the foot on said pedal passes no farther forward than said fulcrum, or not materially farther forward than said fulcrum.

2. In controlling mechanism for motor vehicles, the combination of a brake lever, a pedal pivoted on said brake lever, and an accelerator connection operated by a tilting motion of said pedal about its pivot, the fulcrum of said brake lever occupying a position well forward of a vertical line through the pivot of said pedal so that, when said brake lever is operated, the first part of the motion of said pedal is forward at an upward inclination.

3. In controlling mechanism for motor vehicles, the combination of a brake lever, a pedal pivoted on said brake lever, and an accelerator connection operated by a tilting motion of said pedal about its pivot, the fulcrum of said brake lever occupying a position forward of a line through the pivot of said pedal and perpendicular to the upper surface of said pedal.

4. In controlling mechanism for motor vehicles, the combination of a brake lever, a pedal pivoted on said brake lever, and an accelerator connection operated by a tilting motion of said pedal about its pivot, the fulcrum of said brake lever occupying a position well forward of the pivot of said pedal such that the ordinary pressure of the foot on said pedal has no material tendency to move said lever to apply the brake.

5. In controlling mechanism for motor vehicles, the combination of a brake lever, a pedal pivoted on said brake lever, and an accelerator connection operated by a tilting motion of said pedal about its pivot, the pivot of said pedal and the inclination of said pedal bearing such a relation to the fulcrum of said brake lever as that the ordinary pressure of the foot resting on said pedal has no material tendency to operate said lever and such that an operation of said lever requires a change in the direction of the pressure of the foot.

In testimony whereof, I have signed my name to this specification this 1st day of February, 1922.

WILLARD T. SEARS.